United States Patent [19]
Girard

[11] 3,794,273
[45] Feb. 26, 1974

[54] VTOL ROTOR WING DRONE AIRCRAFT
[75] Inventor: Peter F. Girard, La Mesa, Calif.
[73] Assignee: Teledyne Ryan Aeronautical, a division of Teledyne Industries, Inc., San Diego, Calif.
[22] Filed: Sept. 25, 1972
[21] Appl. No.: 291,582

[52] U.S. Cl............ 244/7 A, 244/8, 244/17.19, 244/39, 416/20, 416/143
[51] Int. Cl. ............................................ B64c 27/24
[58] Field of Search.... 244/2, 6, 7 R, 7 A, 7 B, 7 C, 244/8, 15, 17.11, 17.19, 39, 45 R, 46, 47, 48; 416/143, 121, 130, 171, 120

[56] References Cited
UNITED STATES PATENTS

| | | | |
|---|---|---|---|
| 2,761,635 | 9/1956 | Hiller et al. | 244/17.19 |
| 3,025,022 | 3/1962 | Girard | 244/7 A |
| 3,159,360 | 12/1964 | Ryan et al. | 244/7 A |
| 3,451,644 | 6/1969 | Marchetti et al. | 244/7 A |
| 3,464,650 | 9/1969 | Girard | 244/7 R |
| 3,563,496 | 2/1971 | Zuck | 244/7 A |
| 3,625,631 | 12/1971 | Covington et al. | 416/121 |

Primary Examiner—Duane A. Reger
Assistant Examiner—Randolph A. Reese
Attorney, Agent, or Firm—Brown and Martin

[57] ABSTRACT

An aircraft capable of vertical take-off and landing and high speed cruising flight, utilizing a combine rotary and fixed wing. The wing has a large center body with three radial arms which are pivotal and controllable in the manner of helicopter rotor blades in the wing rotating operation, and incorporate spoilers to minimize center of pressure shift during transition between rotary and fixed modes. In fixed position the wing is stopped with one arm forward in a modified delta configuration, the lateral arms being movable for roll control in cruising flight. Propulsion is by means of a turbojet providing cruising thrust and also wing rotating thrust through tip nozzles in a beam mounted below the wing. In stopped position, the beam is streamlined in alignment with the forward arm, and for rotary wing mode the beam is rotationally displaced relative to the wing to clear the movable arm.

8 Claims, 10 Drawing Figures

PATENTED FEB 26 1974  3,794,273

PATENTED FEB 26 1974
3,794,273
SHEET 3 OF 3

VTOL ROTOR WING DRONE AIRCRAFT

BACKGROUND OF THE INVENTION

The basic rotor wing, which is used in rotary and fixed modes without the necessity for folding or retractable elements, has been proposed in several forms, typified by U. S. Pats. Nos. 3,025,022, 3,146,970, 3,159,360 and others. In each of these the wing has a large lifting center body with radial arms, usually three, which form a modified delta wing in fixed position. During rotation the arms are pivoted in the manner of helicopter rotor blades for lift and directional control. When such a wing is shaft driven in rotation, some means of anti-torque control is necessary, as in a conventional helicopter. Torque can be avoided by using jet reaction to drive the rotor, as in U. S. Pat. No. 3,159,360. In a large aircraft, it is practical to have ducts within the wing, leading to tip nozzles. But in a small aircraft capable of high speed flight, the low thickness to span ratio does not permit internal installation of the wing propulsion means.

SUMMARY OF THE INVENTION

The rotor wing and propulsion system described herein is adaptable to a variety of aircraft types, but is particularly suitable for a small aircraft such as a remotely piloted vehicle (RPV), or drone. A simple fuselage is used to contain the payload and is provided with a sprung leg or skid type landing gear suited to the vertical take-off and landing performance. The turbojet engine is contained in a short pylon on top of the fuselage and the wing is mounted on top of the pylon. A diverter valve in the engine tailpipe directs the exhaust gases either to a rearwardly opening cruise propulsion nozzle, or to a plenum chamber beneath the wing. The upper portion of the plenum chamber is rotatable and conducts gases to nozzles at opposite ends of a propulsion beam mounted directly below the wing, the nozzles being oppositely directed to provide rotational power for the wing.

The wing has a large center body with three radial arms which are pivoted about radial axes to vary their pitch angle in the manner of helicopter rotor blades. In the wing rotating mode the propulsion beam is offset from the arms to provide clearance for their pitch change motion. For cruising flight, the wing is stopped with one arm forward in a modified delta configuration, the propulsion beam being aligned longitudinally with the forward arm. The movable wing arms have spoilers which are operated during transition between rotating and fixed modes, to spoil the lift and minimize shifting of the effective aerodynamic center of the rotor wing at low rotational speeds. A portion of the engine exhaust gas is diverted to a controllable nozzle assembly for directional control at low speeds and for power modulation without excessive use of engine speed adjustment.

The primary object of this invention, therefore, is to provide a new and improved VTOL rotor wing drone aircraft.

Another object of this invention is to provide an aircraft having a wing which is fixed in cruising flight and rotates for vertical take-off and landing, portions of the wing being movable for lift and directional control.

Another object of this invention is to provide a rotor wing aircraft using a common power source for cruise propulsion, and also for wing rotation by means of a reaction type beam unit mounted below the wing.

A further object of this invention is to provide a rotor wing aircraft having a control system which is effective at all speeds and through transition between vertical and cruising flight to maintain stability of the aircraft.

Other objects and many attendant advantages of the invention will become more apparent upon a reading of the following detailed description together with the drawings in which like reference numerals refer to like parts throughout and in which:

FIG. 1 is a side elevation view of the aircraft.
FIG. 2 is a top plan view, with the wing in fixed position.
FIG. 3 is a front elevation view of the aircraft.
FIG. 4 is a top plan view with the wing is rotary configuration.
FIG. 5 is a diagrammatic view of the propulsion system.
FIG. 6 is an enlarged sectional view taken on line 6—6 of FIG. 2.
FIG. 7 is a top plan view of the wing, cut away to show the action of the propulsion beam.
FIG. 8 is an enlarged sectional view taken on line 8—8 of FIG. 7.
FIG. 9 is a diagram of the spoiler control system.
FIG. 10 is an enlarged sectional view taken on line 10—10 of FIG. 5.

DESCRIPTION OF THE PREFERRED EMBODIMENT

Figure 1:
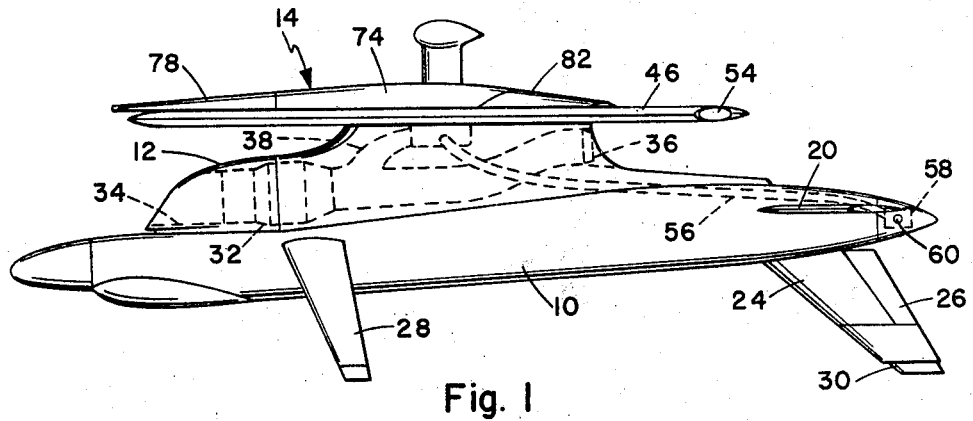

The aircraft as illustrated is typical and has a fuselage 10 for containing equipment and payload, with a short pylon 12 on top of the fuselage. Wing 14 is mounted on top of pylon 12 on a shaft 16, which is supported substantially vertically in the fuselage in suitable bearings 18. At the rear of the fuselage are horizontal tail surfaces 20 with movable elevators 22, and a vertical sub fin 24 with a rudder 26. The landing gear is adapted to vertical take-off and landing operation and comprises a pair of sprung legs 28 extending outwardly and downwardly from the forward portion of the fuselage. The legs 28 and a sprung tip 30 on the lower end of fin 24, provide three point support for the aircraft.

A turbojet engine 32 is mounted in pylon 12, with a front intake 34 and a rearwardly opening tailpipe 36. Immediately at the rear of engine 32, the tailpipe has a branch duct section 38 leading to a fixed plenum chamber 40, which is concentric with wing mounting shaft 16. A diverter valve 42 is installed at the branch section 38 and is operated by actuating means 44 to conduct engine exhaust gas selectively to the tailpipe or plenum chamber.

Immediately below the wing 14 is a streamlined beam member 46, extending radially on opposite sides of the rotational axis and mounted to rotate with the wing. At the center of beam 46 is a rotary plenum chamber 48, coupled to the fixed plenum chamber 40 by suitable rotary seals 50. Extending from plenum chamber 48 are radially opposed ducts 52 leading to tip propulsion nozzles 54, which open to opposite sides of the beam to eject exhaust gas substantially tangentially for rotating the wing. The beam fits closely against the underside of the wing to minimize airflow disturbance.

A small bleed duct 56 extends from plenum chamber 40 to a control unit 58 at the rear of fuselage 10. Control unit 58 has a pair of directional control nozzles 60 and 62 opening to opposite sides of the fuselage. Nozzles 60 and 62 are fitted with flow control or modulating valves 64 and 66, respectively, which are opened and closed simultaneously by control linkage 68. Also in the control unit is a direction control valve 70, actuated by linkage 72 to vary the proportion of gas flow through the two nozzles. Engine exhaust gas is thus used for directional control in vertical and low speed flight by moving valve 70. Operation of valves 64 and 66 provides modulation of engine power by bleeding exhaust gas in a controlled amount and permits fine adjustment of wing rotational power, without the need for varying engine speed. The valve mechanism in the control unit is exemplary, and any suitable arrangement capable of collective and proportional flow control may be used.

The wing 14 has a center body 74 of triangular configuration with the corners truncated to form flat ends 76, and is symmetrical about the axis of rotation. Attached to the truncated ends 76 are radially extending arms 78, 80, and 82, which are essentially indentical wing-like members. Any radial cross section of center body 74 and the chordal cross section of each arm is a lenticular type airfoil. Each of the wing arms is pivotal in pitch angle on a substantially radial hinge shaft 84 journalled in the center body. In the stopped position of the wing, arm 78 is forward and arms 80 and 82 are right and left, for purposes of reference.

Figure 2:
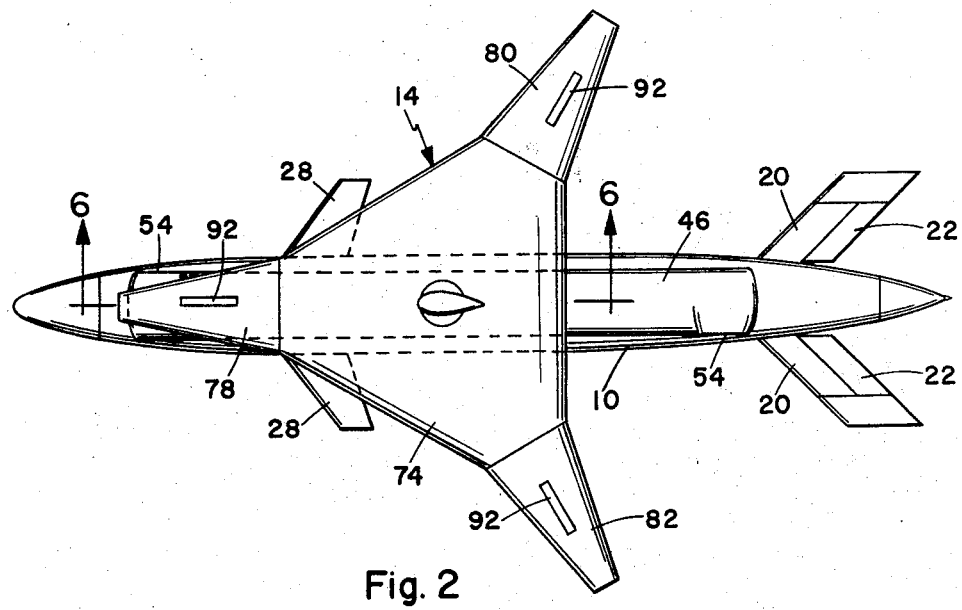
Figure 3:
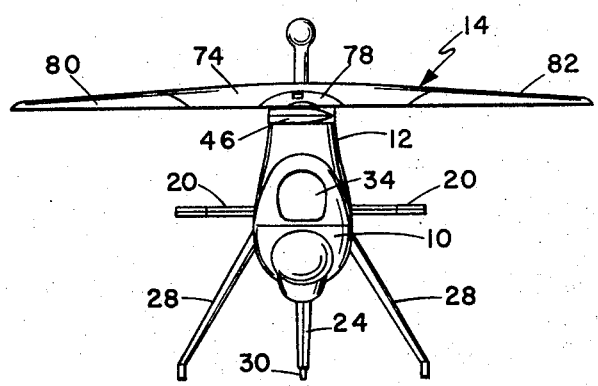
Figure 4:
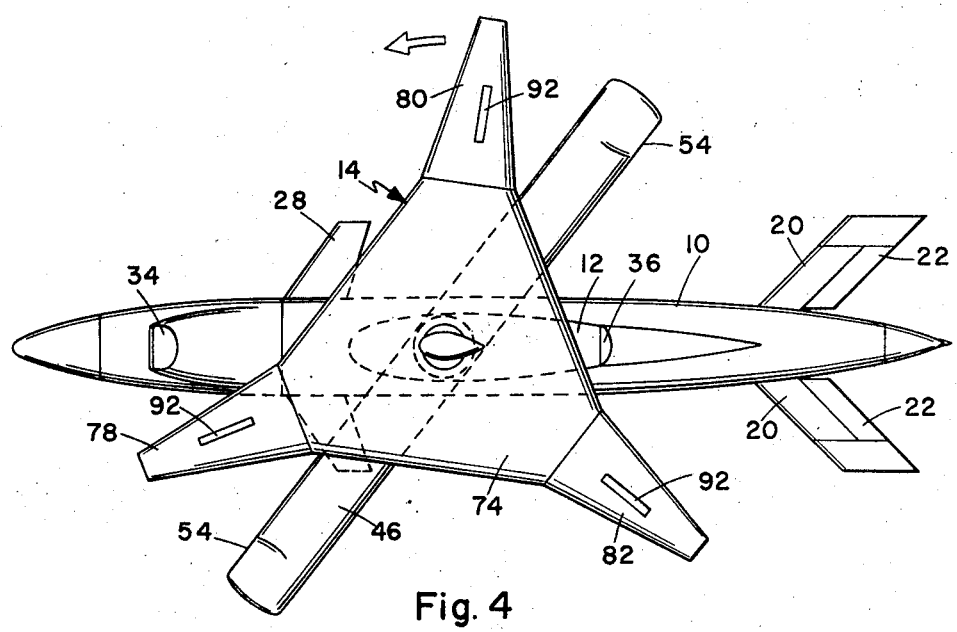
Figure 5:
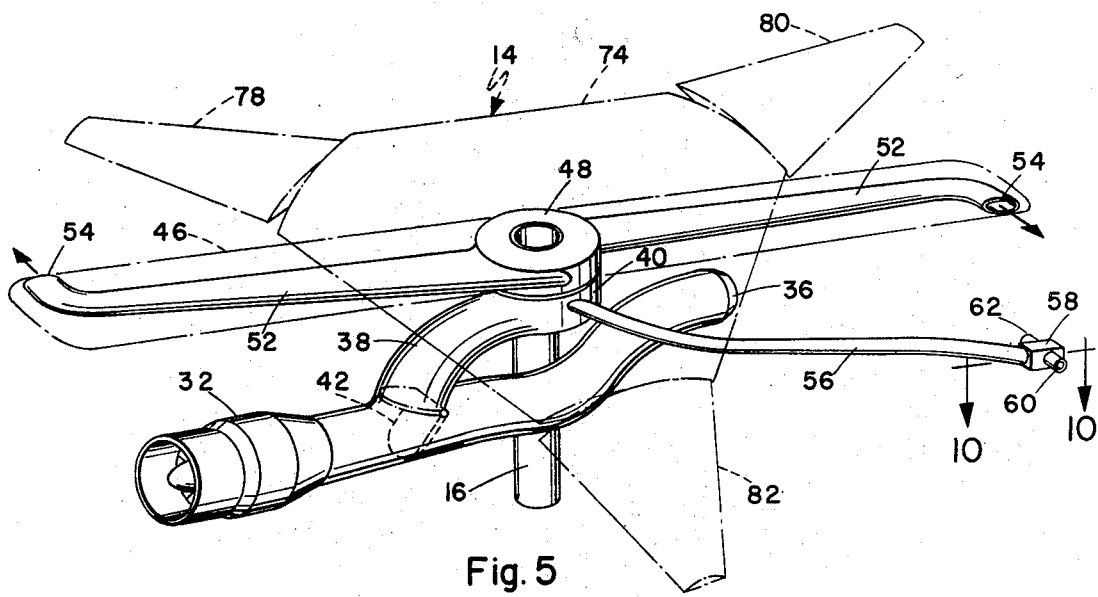

Beam 46 is rotatable with plenum chamber 48 relative to the wing, through an angle of 30°. In stopped wing position, one end of beam 46 is longitudinally aligned below forward arm 78, as in FIGS. 1-3, the other end of the beam extending above the rear fuselage. To provide clearance for pitch change motion of forward arm 78 in wing rotating mode, beam 46 is rotated to the position illustrated in FIGS. 4 and 7, and is then perpendicular to the radial axis of arm 82. One suitable means for rotating the beam is an actuator 86 mounted in center body 74, as in FIG. 7, and connected to a pin 88 fixed in the beam. Pin 88 extends through an arcuate slot 90 in the center body and any suitable stop means, such as the ends of the slot, may be used to limit the beam travel.

Each wing arm has a spoiler 92, comprising a portion of the upper skin structure at approximately mid chord position. The spoiler is pivoted on a hinge 94 at the forward edge, relative to the direction of wing rotation, and is extended and retracted by an actuator 96.

Hinge shafts 84 have pitch control arms 98 connected to pitch control means by tie rods 100 extending through hollow shaft 16. A suitable control system is disclosed in detail in U.S. Pat. No. 3,159,360. This control system includes pitch control operation of the wing arms in both rotating and stopped modes, interconnection to conventional control surfaces, wing locked in stopped position, operation of the exhaust diverter valve, and jet reaction directional control in vertical and low speed flight. The system is compatible with the aircraft thus far described and, for a drone type aircraft, would be remotely operated by conventional radio control means.

Figure 7:
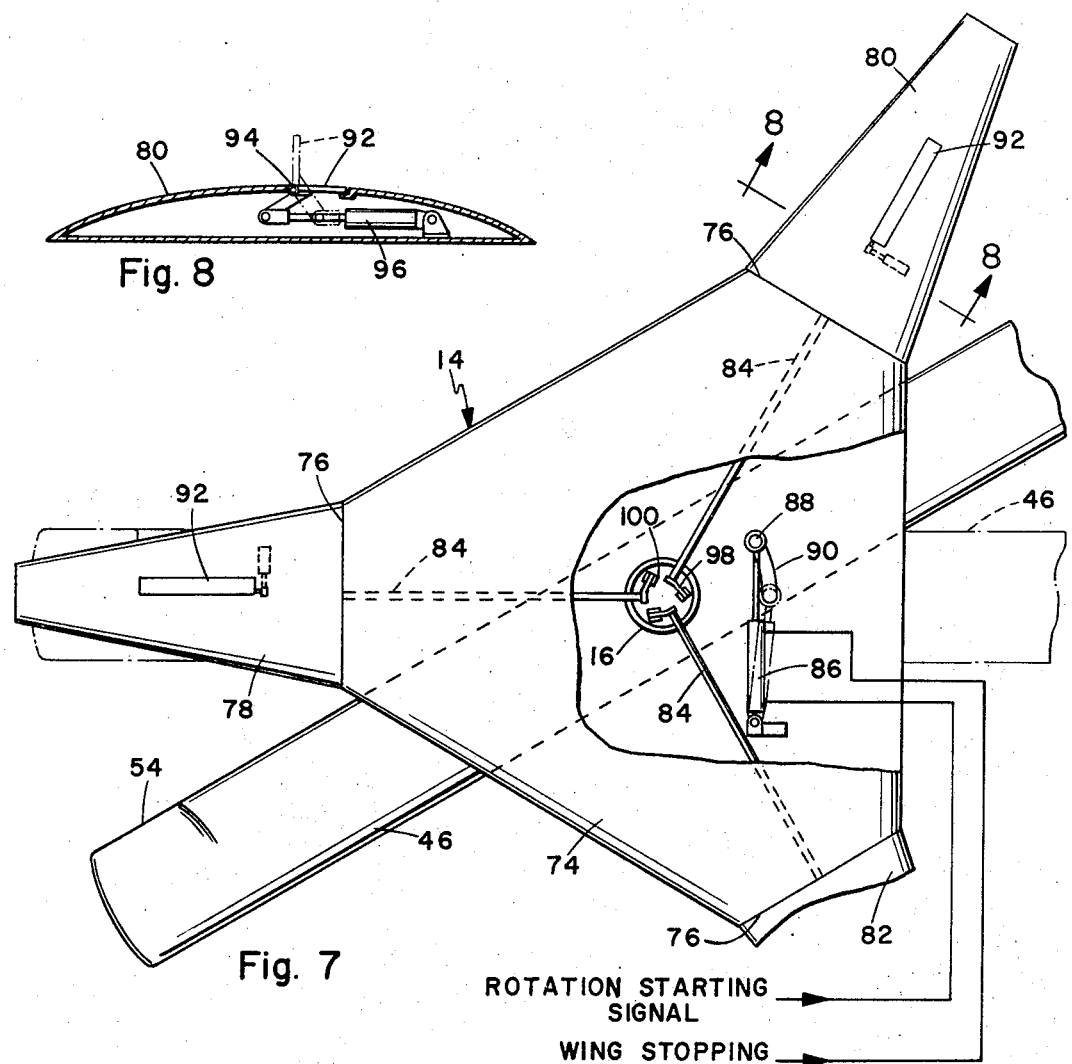

For a typical flight, a wing starting signal is applied to the actuator 86 to offset the beam 46 to its rotary wing position, as in FIG. 7. Diverter valve 42 is moved to block tailpipe 36 and cause the engine exhaust to be directed to plenum chamber 40, and through ducts 52 to the tip nozzles 54, to drive the wing in rotation. The aircraft is lifted off in the manner of a helicopter by collective and cyclic pitch control of the wing arms acting as rotor blades, yaw control being provided by bleed gas flow through control unit 58. Cyclic pitch is then applied to attain forward flight until a suitable transition speed is reached.

Figure 6:
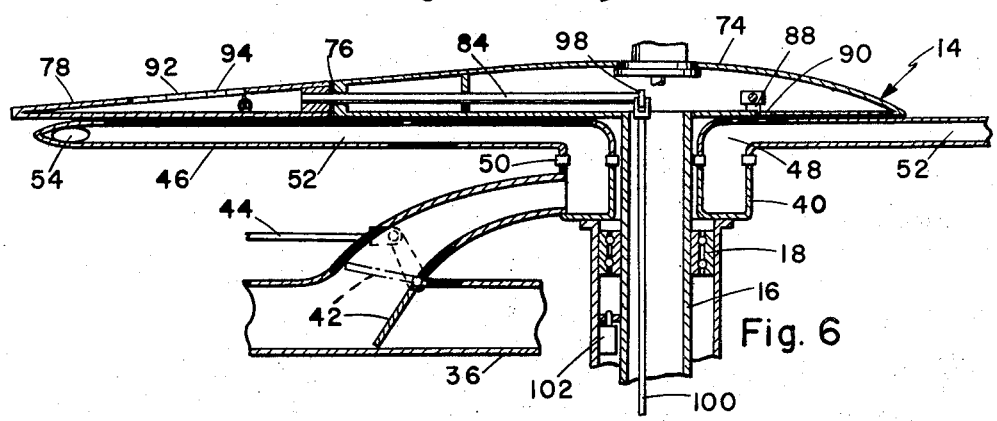
Figure 8:
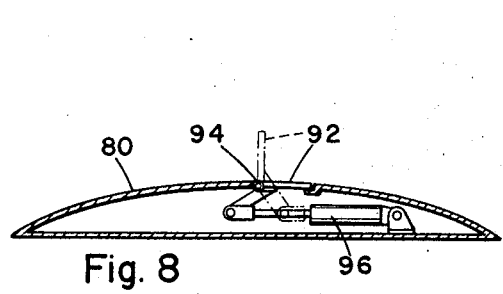
Figure 9:
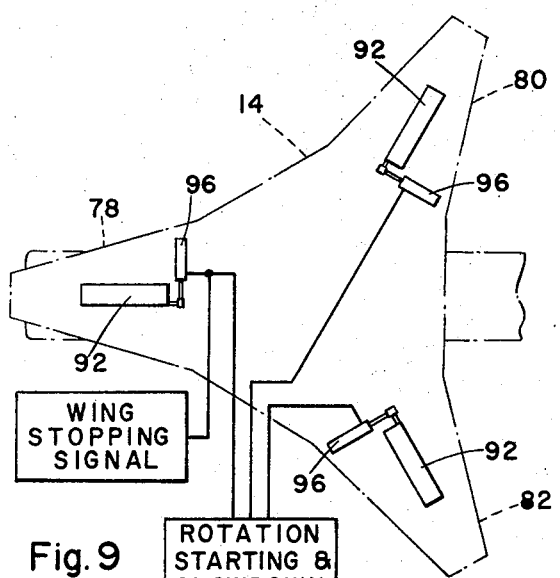
Figure 10:
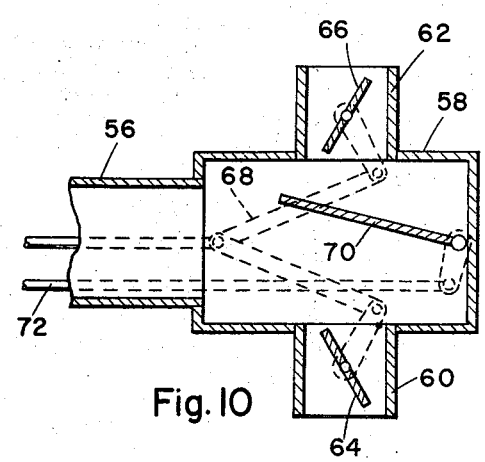

Diverter valve 42 is then moved to direct all engine exhaust through tailpipe 36 for forward propulsion. The aircraft assumes a positive angle of attack and the wing goes into autorotation at gradually decreasing rotational speed. During transition the spoilers 92 are extended by a wing slowdown signal to actuators 96 to spoil lift over the wing arms and prevent undue shifting at the center of lift as the wing slows down. This has been a problem with stoppable rotors due to changes in lift distribution across the rotor disc as the wing arms assume different azimuthal orientations with respect to the line of flight at very low rotor rotational speeds. The spoilers aerodynamically, automatically reduce the magnitude of these changes by spoiling lift as a function of their orientation with respect to the relative wind. As the wing comes to a stop, a wing stopping signal is applied, as in FIG. 9 to retract the spoiler in wing arm 78. The two spoilers remaining extended then act as drag brakes to center the wing with arm 78 forward. The wing stopping signal is also applied to actuator 86 to move the beam 46 into longitudinal alignment with arm 78, and the wing is locked in place by suitable means, such as the latch 102 in FIG. 6. The latch is illustrated as being positioned to lock shaft 16 to the adjacent fixed structure, but could be located to engage the wing, as in the above mentioned U.S. Pat. No. 3,159,360. In cruising flight the aircarft is flown in a conventional manner, the control system referred to above providing the necesary control coupling for all modes of flight.

To return to vertical flight and landing, the aircraft is slowed to a suitable transition speed, spoilers 92 are extended and beam 46 is turned to rotary wing position. Diverter valve 42 is actuated to direct the engine exhaust to rotate the wing. When the wing reaches a predetermined rotational speed, the spoilers are retracted and the aircraft is flown to a landing in the manner of a helicopter.

During vertical and transitional flight, fine adjustment of rotor power can be accomplished without the need for varying engine speed. By collective operation of valves 64 and 66 in control unit 58, the exhaust gas bleed is effectively modulated to vary the power applied to the rotary wing.

The structure and operating technique make it possible to have a small aircraft capable of operating as a helicopter at a low disc loading, and as a high speed fixed wing aircraft, using the same wing and power source in both modes.

Having described my invention, I now claim.

1. An aircraft, comprising:
    an airframe having aerodynamic control surfaces thereon;
    a wing mounted above said airframe for rotation about a substantially vertical axis;
    said wing having a center body and three radially extending airfoil sectioned arms, each pivotally attached to the center body for pitch change motion about a substantially radial axis;

control means coupled to said wing arms for pitch change operation thereof;

means for locking said wing with one of said arms extending longitudinally forwardly over the airframe;

a beam mounted below said wing for limited rotation, relative to said wing, about the wing rotational axis, and having oppositely directed propulsion nozzles at opposite ends thereof;

actuating means for moving said beam between a fixed wing position in longitudinal alignment below said one wing arms, and an offset position clear of the wing arms;

a power souce of compressed gases mounted in said airframe;

gas conducting means connected to said power source, including a rearwardly directed tailpipe and a branch duct communicating with said nozzles;

and a diverter valve in said gas conducting means for directing gases slectively to said tailpipe and said nozzles.

2. An aircraft according to claim 1, wherein said beam fits closely against the underside of said wing and is streamlined therewith in the fixed wing position.

3. An aircraft according to claim 2, wherein said beam has a plenum chamber coaxial with the axis of rotation, with ducts extending from the plenum chamber to said nozzles;

said branch duct having a sealed rotary connection to said plenum chamber.

4. An aircraft according to claim 1, and including a control unit in the rear portion of said airframe, with a gas bleed connection to said branch duct;

said control unit having directional control nozzles opening to opposite sides of the airframe;

and a directional control valve in said control unit, with actuating means for varying the proportion of gas flow through said directional control nozzles.

5. An aircraft according to claim 4, and including modulating valve means in said control unit for varying the total gas flow through the directional control nozzles.

6. An aircraft according to claim 1, wherein each of said wing arms has a lift spoiler hinged in the upper surface thereof;

and spoiler actuating means in the wing for moving said spoilers between extended and retracted positions.

7. An aircraft according to claim 6, wherein said spoiler actuating means includes means for retracting the spoiler in said one wing arm independently of the other spoilers.

8. An aircraft according to claim 1, wherein said aerodynamic surfaces include a fin extending downwardly from the rear portion of said airframe;

a pair of landing gear legs extending from opposite sides of the forward portion of the airframe;

said fin having a lower tip portion comprising a third supporting element of the landing gear.

* * * * *